United States Patent
Xue et al.

(10) Patent No.: US 10,831,741 B2
(45) Date of Patent: *Nov. 10, 2020

(54) LOG-SHIPPING DATA REPLICATION WITH EARLY LOG RECORD FETCHING

(71) Applicant: International Business Machines Corporation, Armonk, NY (US)

(72) Inventors: Xun Xue, Markham (CA); Steven R. Pearson, Portland, OR (US); Roger L. Q. Zheng, Markham (CA); Kevin J. Cherkauer, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/831,183

(22) Filed: Dec. 4, 2017

(65) Prior Publication Data

US 2018/0101558 A1    Apr. 12, 2018

Related U.S. Application Data

(63) Continuation of application No. 12/895,644, filed on Sep. 30, 2010, now Pat. No. 9,864,772.

(51) Int. Cl.
*G06F 16/23*   (2019.01)
*G06F 11/14*   (2006.01)
*G06F 11/20*   (2006.01)

(52) U.S. Cl.
CPC ...... *G06F 16/2358* (2019.01); *G06F 11/1471* (2013.01); *G06F 11/2094* (2013.01);

(Continued)

(58) Field of Classification Search
CPC ............. G06F 16/2308; G06F 16/2358; G06F 16/2379; G06F 11/1471; G06F 11/2094; G06F 11/2097

See application file for complete search history.

(56) References Cited

U.S. PATENT DOCUMENTS 5,379,412 A    1/1995  Eastridge et al.
5,594,900 A    1/1997  Cohn et al.
(Continued)

OTHER PUBLICATIONS

Rastogi, Rajeev et al., "Distributed Multi-Level Recovery in Main-Memory Databases", Distributed and Parallel Databases, Jan. 1998, pp. 41-71, vol. 6, Issue 1, Kluwer Academic Publishers, Hingham, MA.

(Continued)

*Primary Examiner* — Kannan Shanmugasundaram
(74) *Attorney, Agent, or Firm* — Patterson + Sheridan, LLP

(57) ABSTRACT

Techniques for data replication from a primary system to a standby system. A first buffer portion of a transaction log buffer is allocated to a first transaction at a primary system. Upon determining that the first buffer portion is fully formed, before the log data is written to the storage on the primary system, and before the transaction log buffer is entirely full, the log data in the first buffer portion is transmitted to the standby system, from the primary system. Upon writing the log data to the storage on the primary system and after the log data in the first buffer portion is transmitted to the standby system, a notification is transmitted to the standby system, from the primary system, where the standby system is configured to process the received log data responsive to receiving the notification from the primary system.

20 Claims, 6 Drawing Sheets

(52) U.S. Cl.
CPC ...... *G06F 11/2097* (2013.01); *G06F 16/2308* (2019.01); *G06F 16/2379* (2019.01); *G06F 2201/80* (2013.01)

(56) References Cited

U.S. PATENT DOCUMENTS

| | | | |
|---|---|---|---|
| 5,781,910 | A | 7/1998 | Gostanian et al. |
| 5,857,190 | A | 1/1999 | Brown |
| 5,951,695 | A | 9/1999 | Kolovson |
| 6,014,674 | A | 1/2000 | McCargar |
| 6,125,407 | A | 9/2000 | Abily et al. |
| 6,163,856 | A | 12/2000 | Dion et al. |
| 6,226,651 | B1 | 5/2001 | Masuda et al. |
| 6,247,023 | B1 | 6/2001 | Hsiao et al. |
| 6,523,036 | B1 | 2/2003 | Hickman et al. |
| 6,715,099 | B1 | 3/2004 | Smith |
| 6,978,279 | B1 | 12/2005 | Lomet et al. |
| 7,128,270 | B2 | 10/2006 | Silverbrook et al. |
| 7,188,273 | B2 | 3/2007 | Allen et al. |
| 7,464,113 | B1* | 12/2008 | Girkar ................ G06F 16/284 |
| 7,483,911 | B2 | 1/2009 | Cherkauer |
| 7,529,783 | B2 | 5/2009 | Cherkauer et al. |
| 7,739,403 | B1 | 6/2010 | Balakrishna et al. |
| 9,864,772 | B2 | 1/2018 | Cherkauer et al. |
| 2002/0103816 | A1 | 8/2002 | Ganesh et al. |
| 2002/0169889 | A1 | 11/2002 | Yang et al. |
| 2003/0061537 | A1 | 3/2003 | Cha et al. |
| 2003/0120669 | A1 | 6/2003 | Han et al. |
| 2003/0225760 | A1 | 12/2003 | Ruuth et al. |
| 2004/0098425 | A1 | 5/2004 | Wiss et al. |
| 2004/0117368 | A1* | 6/2004 | Saha .................. G06F 13/28 707/999.006 |
| 2004/0158588 | A1 | 8/2004 | Pruet |
| 2004/0190092 | A1 | 9/2004 | Silverbrook et al. |
| 2005/0055445 | A1 | 3/2005 | Gupta et al. |
| 2005/0071336 | A1 | 3/2005 | Najork et al. |
| 2005/0071389 | A1 | 3/2005 | Gupta |
| 2005/0071391 | A1 | 3/2005 | Fuerderer et al. |
| 2005/0138461 | A1 | 6/2005 | Allen et al. |
| 2006/0095478 | A1 | 5/2006 | Cherkauer et al. |
| 2006/0136686 | A1* | 6/2006 | Cherkauer .......... G06F 11/1471 711/162 |
| 2006/0200497 | A1 | 9/2006 | Hu et al. |
| 2007/0185924 | A1 | 8/2007 | Kawamura |
| 2007/0220059 | A1* | 9/2007 | Lu ..................... G06F 16/2358 |
| 2007/0239661 | A1 | 10/2007 | Cattell et al. |
| 2009/0006502 | A1 | 1/2009 | Leung et al. |

OTHER PUBLICATIONS

Noble, Brian D. et al., "Agile Application-Aware Adaptation for Mobility", ACM SIGOPS Operating Systems Review, Dec. 1997, pp. 276-287, vol. 31, Issue 5, ACM, New York, NY.

Kossmann, Donald, "The State of the Art in Distributed Query Processing", ACM Computing Surveys (CSUR), Dec. 2000, pp. 422-469, vol. 32, Issue 4, ACM, New York, NY.

\* cited by examiner

LOG-SHIPPING DATA REPLICATION WITH EARLY LOG RECORD FETCHING

CROSS-REFERENCE TO RELATED APPLICATIONS

This application is a continuation of U.S. patent application Ser. No. 12/895,644, filed Sep. 30, 2010, the contents of which are incorporated herein by reference in its entirety.

BACKGROUND

The present invention generally relates to log-shipping data replication between a primary system and a standby system, and more particularly, to independent log writing and log shipping at the primary system.

System architects and engineers often use multiple computer systems in a production environment in order to ensure the stability of business solutions. In such an environment, even if one computer system fails, the solution may fail over to the other computer systems. As an example, for a solution using a database, the environment may contain both a primary database system and a standby database system. In such an environment, the primary database may be replicated from a primary database management system (hereinafter "DBMS") to a standby DBMS, such that if the primary database system fails, the standby database system contains an up-to-date copy of the database and can assume the workload of the primary database.

One technique for data replication is log-shipping data replication, in which transaction logs are transferred from the primary DBMS to the standby DBMS. The transaction logs may consist of database operations performed on the database by the primary DBMS. The standby DBMS may then process the transaction log, such that the instance of the database on the standby system is updated to reflect the instance of the database on the primary system. One known method for log-shipping data replication is to maintain a log buffer on the primary system, to periodically commit data in the log buffer to storage, and once the data is successfully stored, to transmit the stored data to the standby DBMS. Another known method is to concurrently write the data in the log buffer to storage and transmit the data in the log buffer to the standby DBMS. Although such solutions are advantageous in that they ensure that the standby DBMS only receives log data that the primary DBMS has stored or has definitely intended to commit to storage, such solutions also negatively impact the performance of the primary DBMS by creating bursts of high activity on the primary DBMS and on the network connecting the primary system and standby system.

SUMMARY

Embodiments of the invention provide a method, system and computer-readable storage medium for data replication. The method, system, and computer-readable storage medium include allocating a first buffer portion of a transaction log buffer to a first transaction at a primary system communicatively coupled to the standby system, where the first buffer portion is fully formed when filled with log data related to the first transaction and to be written to storage on the primary system. The method, system, and computer-readable storage medium include, upon determining that the first buffer portion is fully formed, before the log data is written to the storage on the primary system, and before the transaction log buffer is entirely full, transmitting the log data in the first buffer portion to the standby system, from the primary system. Additionally, the method, system, and computer-readable storage medium include, upon writing the log data to the storage on the primary system and after the log data in the first buffer portion is transmitted to the standby system, transmitting a notification to the standby system, from the primary system, wherein the standby system is configured to process the received log data responsive to receiving the notification from the primary system.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
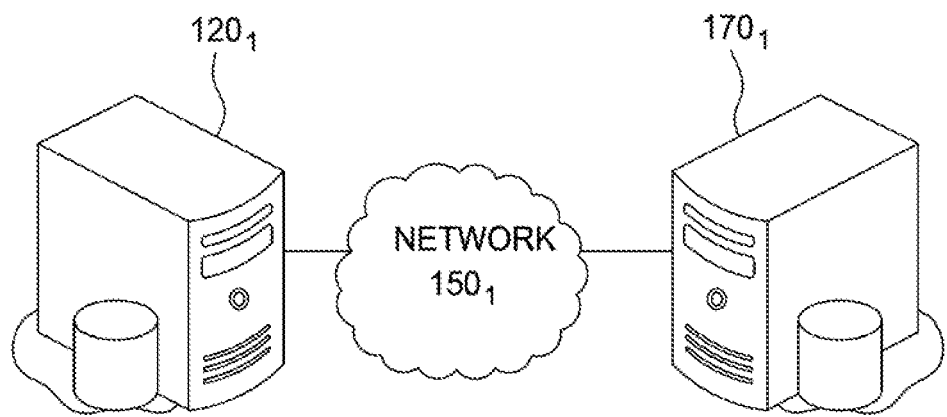
FIGS. 1A-1B illustrate log-shipping data replication systems, according to embodiments of the present embodiment.

Log-shipping data replication is a common technique used by database systems to increase availability of a respective database to applications. In such a configuration, a primary instance of the database (e.g., on a primary system) transfers copies of its log records to a standby instance of the database (e.g., on a standby system), where the logged operations are replayed in a fashion similar to that of ordinary database recovery operations (e.g., crash recovery or rollforward recovery). However, because an updated copy of the database is maintained on the standby system, the standby may take over as a new primary instance of the database in case of a failure of the original primary instance of the database. As such, the database is generally available as long as either the primary system or the standby system is functioning properly, providing protection against a single point of failure.

Two measures of the usefulness of log-shipping data replication are transactional consistency and the performance impact on the primary instance of the database. Transactional consistency concerns the degree of guarantees the system provides that transactions performed at the primary instance of the database are neither lost nor completed with different outcomes at each standby instance of the database, both during normal operation and in case of the failure of either database instance. The performance impact on the primary instance of the database concerns the degree to which the normal processing of the primary instance of the database is slowed down in order to accomplish the log-shipping data replication activity. These two characteristics can be tuned by configuration choices and other factors, and in some cases, the choices trade off one against the other. Ideally, a log-shipping data replication solution will optimize both characteristics to the greatest extent possible.

The primary system may also include a transaction log buffer. Data may be written to the transaction log buffer as operations are performed on the instance of the database on the primary system. For example, the transaction log buffer may contain a list of log records for database operations that were executed on the instance of the database on the primary system. This information may then be periodically committed to storage (e.g., a hard disk) on the primary system, so that it may be subsequently used, for example, for database recovery operations.

One existing technique for log-shipping data replication is to send data in the transaction log buffer to the standby DBMS concurrently with committing the data to storage. By doing this, the instance of the database on the standby system may be kept up-to-date with the instance of the database on the primary system, allowing the standby DBMS to assume the role of the primary DBMS in the event the primary system fails. Additionally, because the data is sent to the standby DBMS and written to storage concurrently, the standby DBMS and the primary DBMS may be better synchronized in the event of a failure, since the standby DBMS will receive data that the primary DBMS has definitely intended to commit to storage. That is, in the event the primary system fails, upon resuming, the primary system may only recall the data that has been written to stable storage, and may be unable to retrieve the transaction data that was in the log buffer in memory (and was not written to stable storage).

In such a scenario, if the transaction data that was in the log buffer in memory was already processed by the standby DBMS, the primary DBMS and standby DBMS would be out of sync with one another. Correcting such a synchronization problem may require a substantial amount of time from the database administrators designing and implementing a solution to correct the synchronization issue, as well as resources from the primary DBMS and the standby DBMS. However, one disadvantage to such a technique is that it produces bursts of high workload for the primary DBMS, as the transaction data is concurrently written to stable storage and sent to the standby DBMS. Such spikes in the workload may adversely affect the performance of the primary DBMS, and may limit the usefulness of such a technique.

Embodiments of the invention provide techniques for log-shipping data replication, in a way that ensures transactional consistency between the primary DBMS and the standby DBMS, while minimizing the performance impact on the primary DBMS. Embodiments may receive log data at a standby system, from a primary system. Such log data may be sent by the primary system once the log data is completely formed, and before the log data is written to storage on the primary system. Upon writing the log data to storage, the primary system may send a notification to the standby system, indicating that the log data was written to storage on the primary system. Responsive to receiving the notification, the standby system may process the received log data. Such processing may include, for example, executing one or more operations in the received log data against a database on the standby system. Advantageously, by doing this, embodiments of the invention reduce the performance impact to the primary system of the log-shipping data replication, while still ensuring transactional consistency between the primary system and standby system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a database management system) or related data available in the cloud. For example, the database management system could execute on a primary computing system in the cloud, and could replicate its transaction log to a standby computer system in the cloud. In such a case, because an updated copy of the database is maintained on the standby computer system, the standby computer system may assume the role of the primary database system in the event the primary database system fails or otherwise becomes unavailable. Doing so allows a user to access information in the database from any computing system attached to a network connected to the cloud (e.g., the Internet).

Figure 1B:
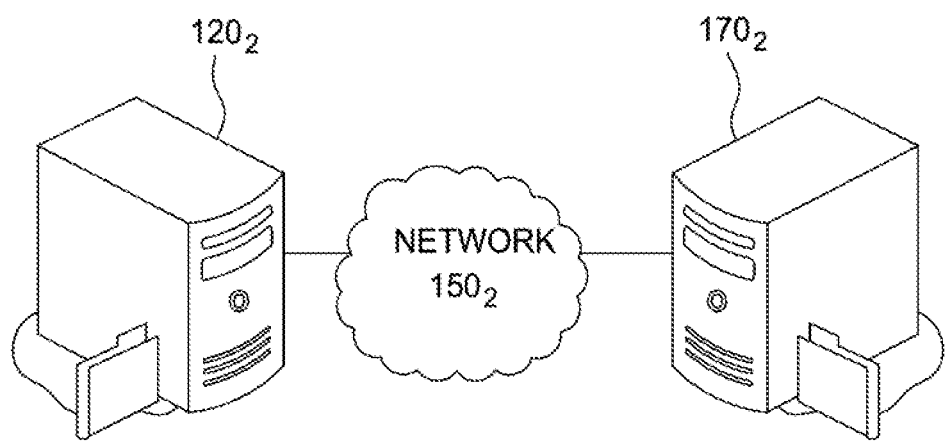

FIGS. 1A-1B illustrate log-shipping data replication systems, according to embodiments of the present invention. As shown, FIG. 1A shows a primary database server $120_1$ connected via a network $150_1$ to a standby database server $170_1$. In such a configuration, a primary DBMS on the primary database server $120_1$ may maintain a transaction log buffer containing operations executed against an instance of the database on the primary database server $120_1$. The transaction log buffer may contain data relating to multiple transactions involving the database, and the data for each transaction may be said to be fully formed once all the requested space for that transaction has been filled. For example, if an entity requests 30 bytes of space in the transaction log buffer, once the entity has written 30 bytes of data to the requested portion of the transaction log buffer, that portion of data in the buffer is said to be fully formed. Once a portion of data in the buffer is fully formed, the primary DBMS may send the data to a standby DBMS on the standby database server $170_1$. In one embodiment, the primary DBMS processes the transaction log buffer sequentially. In such an embodiment, the primary DBMS sends only contiguous, fully-formed portions of the transaction log buffer to the standby DBMS on the standby database server $170_1$. Once the primary DBMS writes the data in the transaction log buffer to storage, the standby DBMS may process the received log data against an instance of the database on the standby database server $170_1$.

Although embodiments of the present invention may be described herein using examples of replication between two database servers, such examples are for illustrative purposes only, as embodiments of the invention may be implemented between any two servers capable of performing the functions described herein. For example, FIG. 1B shows a primary file server $120_2$ connected via a network $150_2$ to a standby file server $170_2$. In such a configuration, a file-sharing service on the primary file server $120_2$ may maintain a log buffer of modifications to files on the primary file server $120_2$. The log buffer may contain modification data relating to multiple files, and the data for each modification of a file may be said to be fully formed once all the requested space for that modification has been filled. For example, if an entity requests 30 bytes of space in the transaction log buffer, once the entity has written 30 bytes of data to the requested portion of the log buffer, that portion of data in the buffer is said to be fully formed. Once a portion of data in the buffer is fully formed, the file-sharing service on the primary file server 120$_2$ may send the data to a standby file-sharing service on the standby database server 170$_2$. Once the primary file-sharing service writes the data in the log buffer to storage, the standby file-sharing service may process the received modification data against instances of the files on the standby file server 170$_2$.

Figure 2:
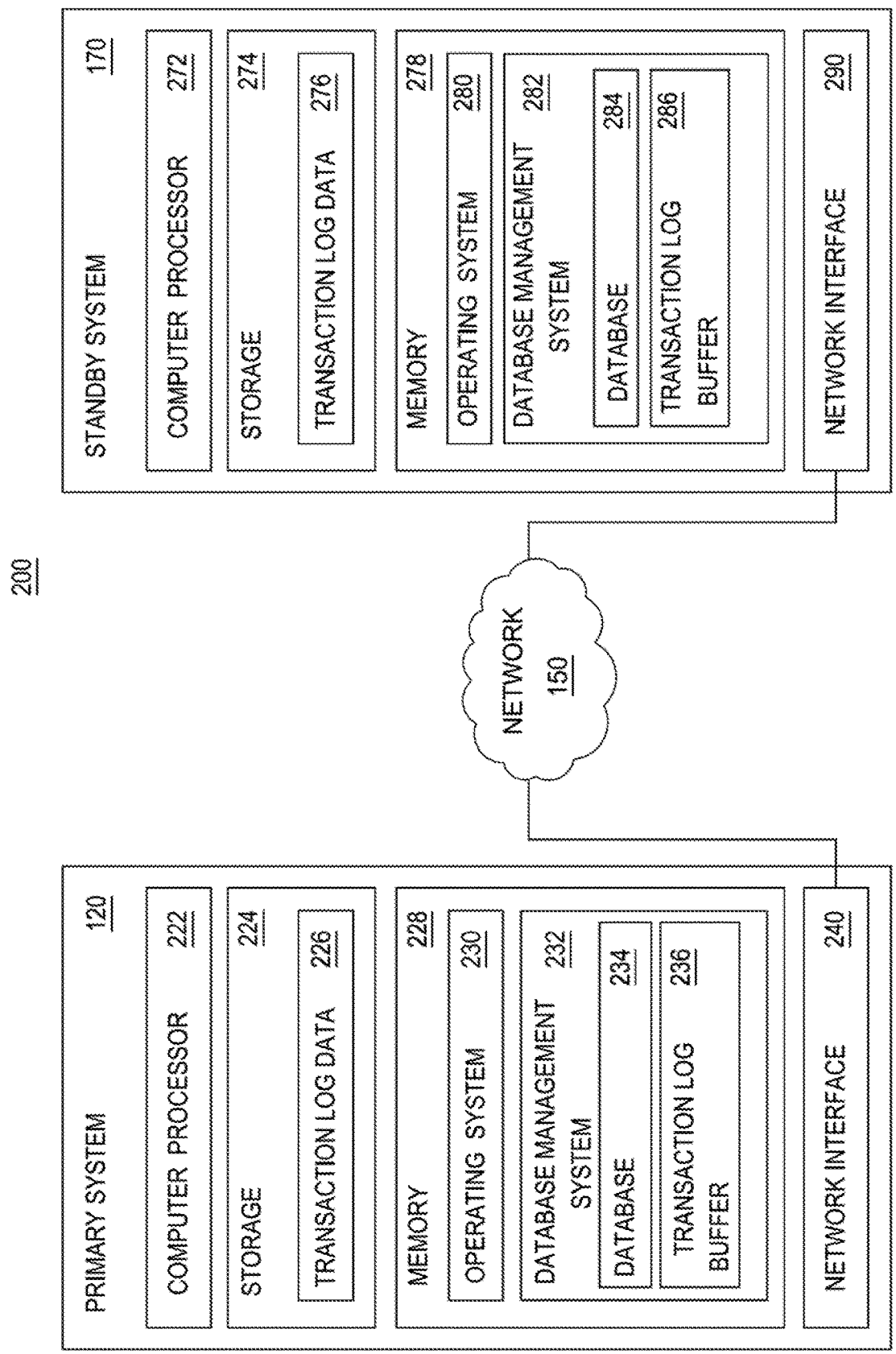
FIG. 2 is a block diagram illustrating a log-shipping data replication system, according to one embodiment of the present invention.

FIG. 2 is a block diagram illustrating a log-shipping data replication system, according to one embodiment of the present invention. As shown, the system 200 contains a primary system 120 and a standby system 170. The primary system 120 contains a computer processor 222, storage media 224, memory 228 and a network interface 240. Computer processor 222 may be any processor capable of performing the functions described herein. Storage media 224 contains transaction log data 226. The transaction log data 226 may include one or more operations that have been executed against the database 234. The primary system 120 may connect to the network 150 using the network interface 240. Furthermore, as will be understood by one of ordinary skill in the art, any computer system capable of performing the functions described herein may be used.

In the pictured embodiment, memory 228 contains an operating system 230 and a database management system (also referred to herein as a "DBMS") 232. Although memory 228 is shown as a single entity, memory 228 may include one or more memory devices having blocks of memory associated with physical addresses, such as random access memory (RAM), read only memory (ROM), flash memory or other types of volatile and/or non-volatile memory. The DBMS 232 contains a primary database 234 and a transaction log buffer 236. The transaction log buffer 236 may generally contain transaction data relating to operations that have been executed against the database 234, but have not yet been written to storage 224 (e.g., as transaction log data 226). The operating system 230 may be any operating system capable of performing the functions described herein.

The standby system 170 contains a computer processor 272, storage media 274, memory 278 and a network interface 290. Computer processor 272 may be any processor capable of performing the functions described herein. Storage media 274 contains transaction log data 276. The transaction log data 276 may include one or more operations that have been executed against the database 284. The standby system 170 may connect to the network 150 using the network interface 290. Furthermore, as will be understood by one of ordinary skill in the art, any computer system capable of performing the functions described herein may be used.

In the pictured embodiment, memory 278 contains an operating system 280 and a standby DBMS 282. Although memory 278 is shown as a single entity, memory 278 may include one or more memory devices having blocks of memory associated with physical addresses, such as random access memory (RAM), read only memory (ROM), flash memory or other types of volatile and/or non-volatile memory. The standby DBMS 282 contains a replicated database 284 and a replicated transaction log buffer 286. The operating system 280 may be any operating system capable of performing the functions described herein. The transaction log buffer 286 may generally contain transaction data received from the primary DBMS 232, but that has not yet been executed against the replicated database 284.

In one embodiment, the DBMS 232 on the primary system 120 may replicate the database 234 to the standby DBMS 282 on the standby system 170. As such, the database 234 and the database 284 may contain identical data. The replication may be performed in part using the network 150. The replication may be physical replication, such as log-shipping data replication. Using log-shipping data replication, the primary DBMS 232 may replicate a log of database operations performed on the primary database 234 to the standby DBMS 282. Generally, upon receiving the log of database operations, the standby DBMS 282 may perform the database operations on the standby database 284. Under physical replication, the data values in the primary database 234 and standby database 284 may be identical. Furthermore, under physical replication, because the identical database operations may be performed on both the primary database 234 and the standby database 284, the underlying database structures of database 234 and 284 may also be the same.

According to one embodiment of the invention, the primary DBMS 232 may monitor the transaction log buffer 236 to identify any fully-formed portions. Generally, a portion is fully formed when all the requested space in the transaction log buffer 236 pertaining to that portion is filled. For example, if a particular database agent requests 30 bytes of space in the transaction log buffer 236 for a particular set of transaction data, the corresponding portion of the buffer 236 is said to be fully formed once the particular database agent has written all 30 bytes of data to the buffer 236. Upon identifying fully-formed portion(s) of the transaction log buffer 236, the primary DBMS 232 may send the log data in these portions to the standby DBMS 282 (e.g., using the network 150). Furthermore, although the monitoring and sending is described as performed by the primary DBMS 232, such a depiction is for illustrative purposes only, and one of ordinary skill in the art will quickly recognize that such actions may be performed by any entity on the primary system 120 or elsewhere, that is capable of performing the functions described herein.

Upon receiving the log data, the standby DBMS 282 may store the received log data in the transaction log buffer 286. At some later point, the primary DBMS 232 may write any fully-formed portions of the transaction log buffer 236 to storage 224 as transaction log data 226. The primary DBMS 232 may then send a notification to the standby DBMS 282, indicating that the data has been stored. Upon receiving the notification, the standby DBMS 282 may process the received log data stored in the transaction log buffer 286.

Advantageously, by sending the log data to the standby DBMS 282 once the data is fully formed, rather than concurrently with storing the log data, embodiments of the invention may reduce bursts of high workload on the primary system 120. Additionally, embodiments may make better use of the communications network 150 between the primary system 120 and standby system 170 by sending smaller, more frequent network messages. Advantageously, this results in smoother transfer rates of data across the network 150.

Furthermore, because embodiments may send the log data to the standby DBMS 282 sooner than prior techniques, this may result in improved transactional consistency and improved performance. For example, in asynchronous log shipping modes, embodiments result in improved transactional consistency in the event of a failover to the standby system 170. Generally, in asynchronous replication, a confirmation for a transaction is returned to a requesting entity as soon as corresponding log data is written to storage on the primary system 120, and regardless of whether such data has been stored on the standby system 170. In such a configuration, embodiments may improve transactional consistency in the event of a failover by shrinking the gap between operations performed by the primary DBMS 232 and those performed (or available to be performed) on the standby DBMS 282. That is, because the log data may be sent to the standby DBMS 282 more quickly, the log data may be processed (or is available to be processed) by the standby DBMS 282 more quickly.

Additionally, embodiments of the invention may improve the performance in synchronous log shipping modes by returning a confirmation to a requesting entity more quickly. Generally, in synchronous replication, a confirmation for a transaction is not returned to the requesting entity until corresponding log data has been written to storage on both the primary system 120 and the standby system 170. By sending the log data to the standby DBMS 282 sooner, the standby DBMS 282 may write the received log data to storage at an earlier point in time, and accordingly a confirmation may be returned to the requesting entity earlier as well.

Figure 3:
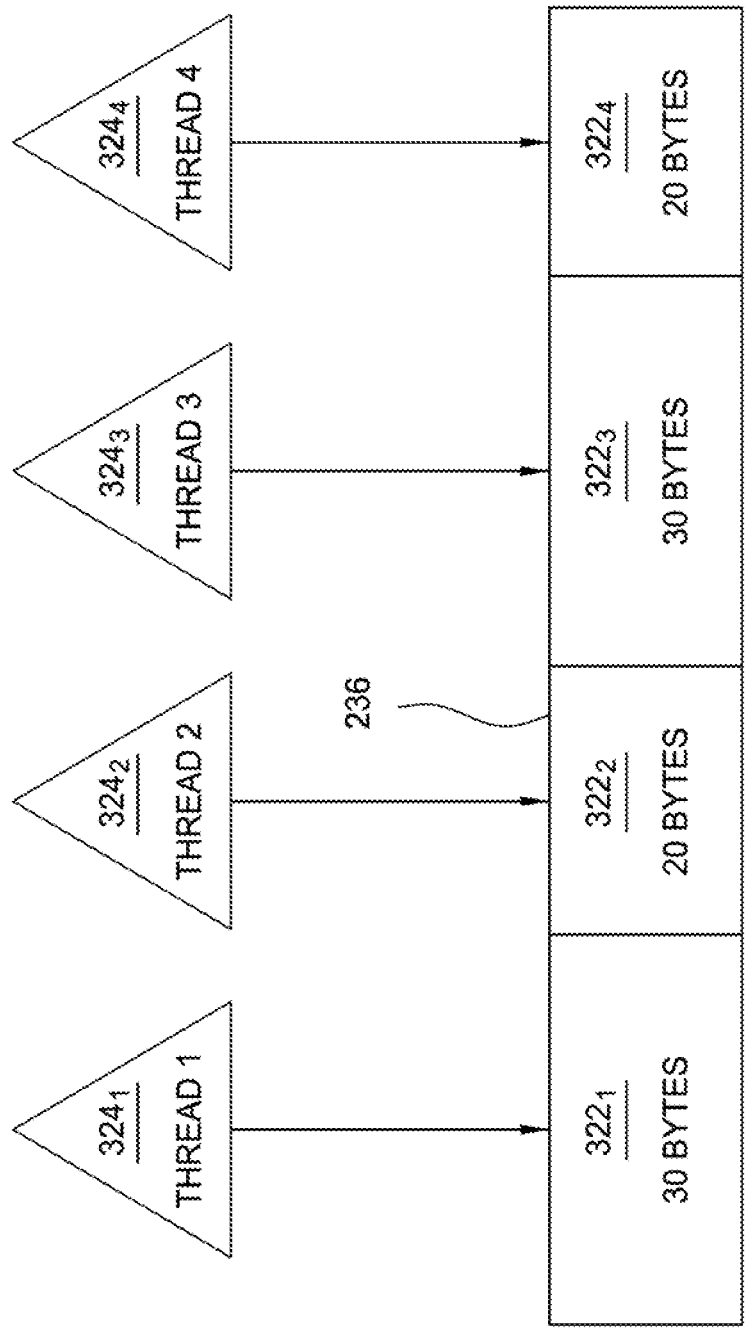
FIG. 3 illustrates an exemplary transaction log buffer, according to one embodiment of the present invention.

FIG. 3 illustrates an exemplary transaction log buffer, according to one embodiment of the present invention. For purposes of this example, assume the depicted transaction log buffer 236 resides on the primary system 120 shown in FIG. 2 and discussed above. The depicted embodiment 300 includes a transaction log buffer 236 and a plurality of threads 324. As shown, each of the threads 324 is configured to write log data to a corresponding portion 322 of the transaction log buffer 236. For example, each of the threads 324 may represent a different database agent in a particular DBMS. The threads 324 may each request a portion of the transaction log buffer 236, and may write data to their respective portion of the buffer 236. In the depicted example, thread 1 $324_1$ has requested 30 bytes of space in the transaction log buffer 236, shown as portion $322_1$. As the thread $324_1$ performs operations on the database (or as the operations to be performed by another entity), thread $324_1$ writes the operations to the corresponding portion $322_1$ of the transaction log buffer 236. Furthermore, once the thread $324_1$ has written 30 bytes of operations to the corresponding portion $322_1$ of the buffer 236, the portion $322_1$ is said to be fully formed. As discussed above, the primary DBMS 232 may then send the fully-formed portion of log data to the standby DBMS 282, according to embodiments of the present invention.

In one embodiment of the invention, the primary DBMS 232 may identify contiguous fully-formed portions of the log buffer 236, and transmit these contiguous fully-formed portions to the standby DBMS 282. For example, assume that threads $324_1$, $324_2$ and $324_4$ have completely filled their respective portions $322_1$, $322_2$, and $322_4$ of the log buffer 236. Furthermore, assume that thread $324_3$ has not yet filled its portion $322_3$ of the log buffer 236. In this example, the primary DBMS 232 may identify the portions $322_1$ and $322_2$ as contiguous, fully-formed portions of the log buffer 236 and may accordingly write these portions $322_1$ and $322_2$ to the standby DBMS 282. However, in such an embodiment, the primary DBMS 232 may not transmit the portion $322_4$, even though such a portion is fully-formed, until the portion $322_3$ is also fully-formed.

One advantage to such an embodiment is that because the log buffer 236 is processed sequentially and only contiguous, fully-formed portions are transmitted to the standby DBMS 282, the last-written log position (or "LWLP") of the primary DBMS 232 may be used by the standby DBMS 282 to identify which portions of the log buffer 236 the primary DBMS 232 has stored. Accordingly, and as discussed in more detail later, the primary DBMS 232 may be configured to transmit the LWLP to the standby DBMS 282, and the standby DBMS 282 may be configured to perform actions responsive to the receiving the LWLP. For example, in one embodiment, upon receiving the LWLP from the primary DBMS 232, the standby DBMS 282 may process all portions of the received log buffer 286 occurring prior to the LWLP. That is, because the primary DBMS 232 processes the log buffer 236 sequentially, the standby DBMS 282 may process the portions of the log buffer 286 occurring prior to the LWLP because the primary DBMS 232 has already stored these portions.

Figure 4:
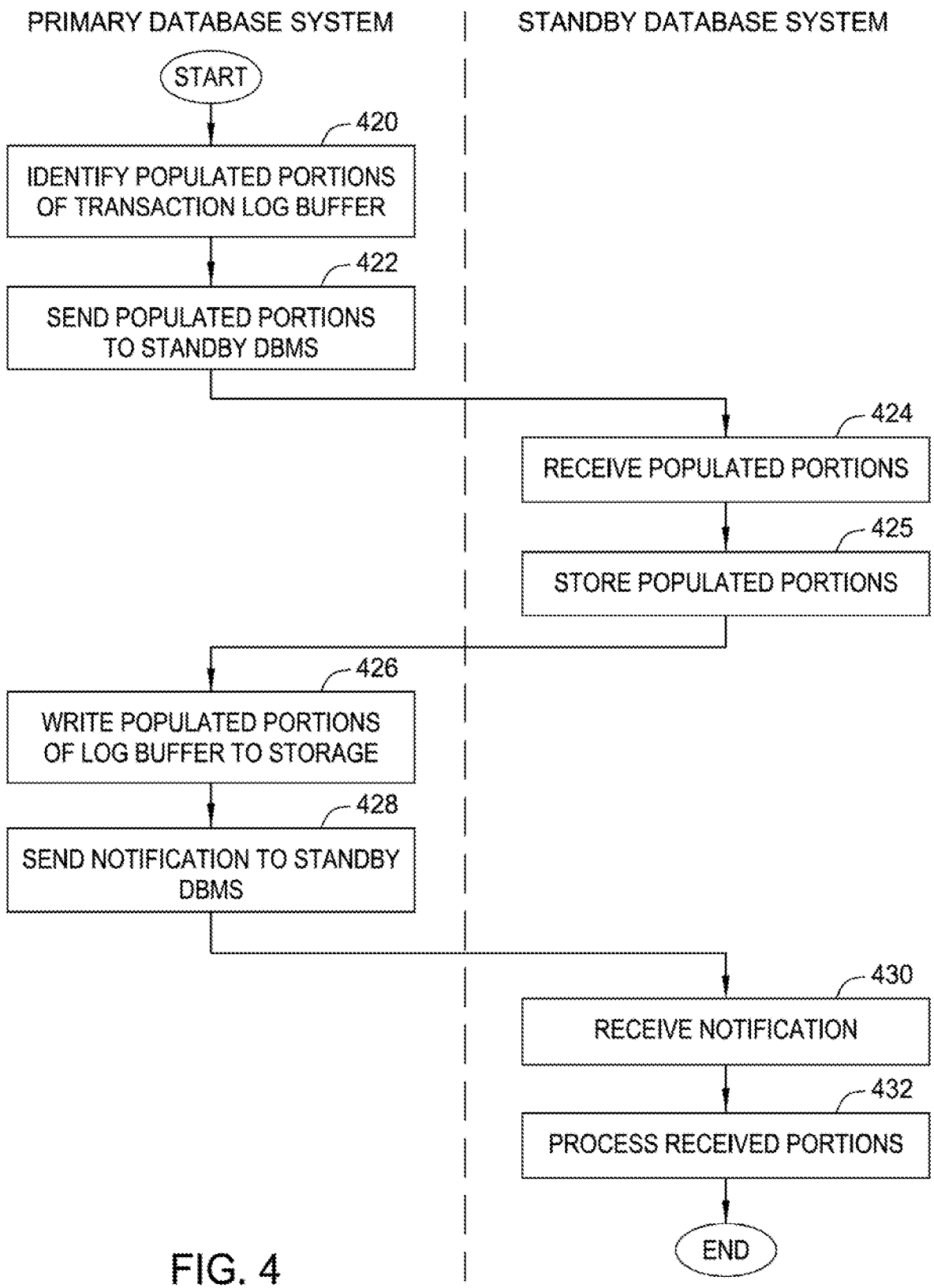
FIG. 4 is a flow diagram illustrating a method for log-shipping data replication, according to one embodiment of the present invention.

FIG. 4 is a flow diagram illustrating a method for log-shipping data replication, according to one embodiment of the present invention. As shown, the method 400 begins at step 420, where the primary DBMS 232 identifies any fully-populated portions (also referred to herein as fully formed portions) of the transaction log buffer 236. For example, in one embodiment, a monitoring component on the primary system 120 may periodically analyze metadata associated with the transaction log buffer 236 to identify any fully-populated portions of the buffer 236. Furthermore, as discussed above, the log data may be written to the transaction log buffer 236 by, for example, a plurality of database agents, each running on a separate thread on the primary system 120. Once the fully-populated portions are identified, the primary DBMS 232 then sends the identified portions to the standby DBMS 282 (step 422). As discussed above, in an embodiment where the primary DBMS 232 processes the transaction log buffer 236 sequentially, the primary DBMS 232 may send only contiguous, fully-formed portions of the transaction log buffer 236 to the standby DBMS 282.

The standby DBMS 282 then receives the fully-populated portions from the primary DBMS 232 (step 424) and stores the received portions in the transaction log buffer 286 (step 425). Although the method 400 describes the received portions as stored in the transaction log buffer 286, such an example is for illustrative purposes only, and of course the received log data may be stored elsewhere. For example, in one embodiment of the invention, upon receiving the fully-formed portions of log data, the standby DBMS 282 may write the received log data to storage 274 on the standby system 170. In one embodiment of the invention, upon successfully writing the received log data to storage 274, the standby DBMS 282 sends an acknowledgement to the primary DBMS 232, indicating that the received log data has been successfully stored.

At some later point in time, the primary DBMS 232 writes the populated portions of the transaction log buffer 236 to the transaction log data 226 in storage 224 on the primary system 120 (step 426). For example, in one embodiment, a monitoring component may periodically analyze metadata associated with the transaction log buffer 236 to identify any fully-formed portions of the buffer, and upon identifying any such portions, may write these portions to storage 224. Additionally, although step 426 is depicted as occurring subsequent to step 425, such a depiction is without limitation and for illustrative purposes only. More generally, the primary DBMS 232 may write the populated portions of the transaction log buffer 236 to storage 224 at any point after step 422, where the primary DBMS 232 sends the populated portions to the standby DBMS 282.

Once the fully-formed portions are stored, the primary DBMS 232 sends a notification to the standby DBMS 282 (step 428). In one embodiment, the notification includes a last-written log position (also referred to herein as "LWLP") for the primary DBMS 232. In an embodiment where the log buffer is processed sequentially, the LWLP represents the furthest page of the data buffer that the DBMS 232 has written to stable storage. Accordingly, by receiving the LWLP from the primary DBMS 232, the standby DBMS 282 may determine which pages of the log buffer the primary DBMS 232 has committed to storage. As described herein, a log flush occurs when the primary DBMS 232 writes any fully-formed portions of the transaction log buffer 236 to storage (e.g., storage media 224). The standby DBMS 282 may then use the LWLP to determine whether the primary DBMS 232 has written the log data to storage.

The standby DBMS 282 then receives the notification (step 430) and, responsive to receiving the notification, processes the received portions of the transaction log buffer (step 432). In one embodiment, the standby DBMS 282 processes only the received portion of the transaction log buffer that occur prior to the indicated LWLP received in step 428. The received portions of the transaction log buffer may each contain one or more operations. In such an embodiment, the processing may include executing each of the one or more operations against the standby database 284 on the standby system 170. By executing these operations against the database 284, the standby database 284 remains synchronized with the primary database 234. Once the received portions are processed, the method 400 ends.

Advantageously, the method 400 improves upon current techniques for log-shipping data replication by allowing for a more consistent workload on the primary system 120. That is, rather than waiting to send the log data to the standby system 170 in a batch when the transaction log buffer 236 is flushed, embodiments may send the log data to the standby system 170 upon determining the log data is fully formed, and before the log data is written to storage on the primary system 120. Accordingly, the method 400 also makes better use of the communications network 150, as smaller and more frequent network messages are sent from the primary system 120 to the standby system 170, resulting in smoother data transfer rates across the network 150. Furthermore, as discussed above, the method 400 may improve the transactional consistency of the data replication in the event of a failure of the primary system 120, in an asynchronous log shipping configuration. That is, because the log data is sent to the standby system 170 once it is fully formed, the standby system 170 may receive the data more quickly, and accordingly, the standby DBMS 282 may process the data (or at least have the data available to be processed) more quickly. Additionally, as discussed above, the method 400 may advantageously improve the performance of the data replication in a synchronous log shipping configuration, by returning a confirmation to a requesting entity more quickly than current techniques.

Figure 5:
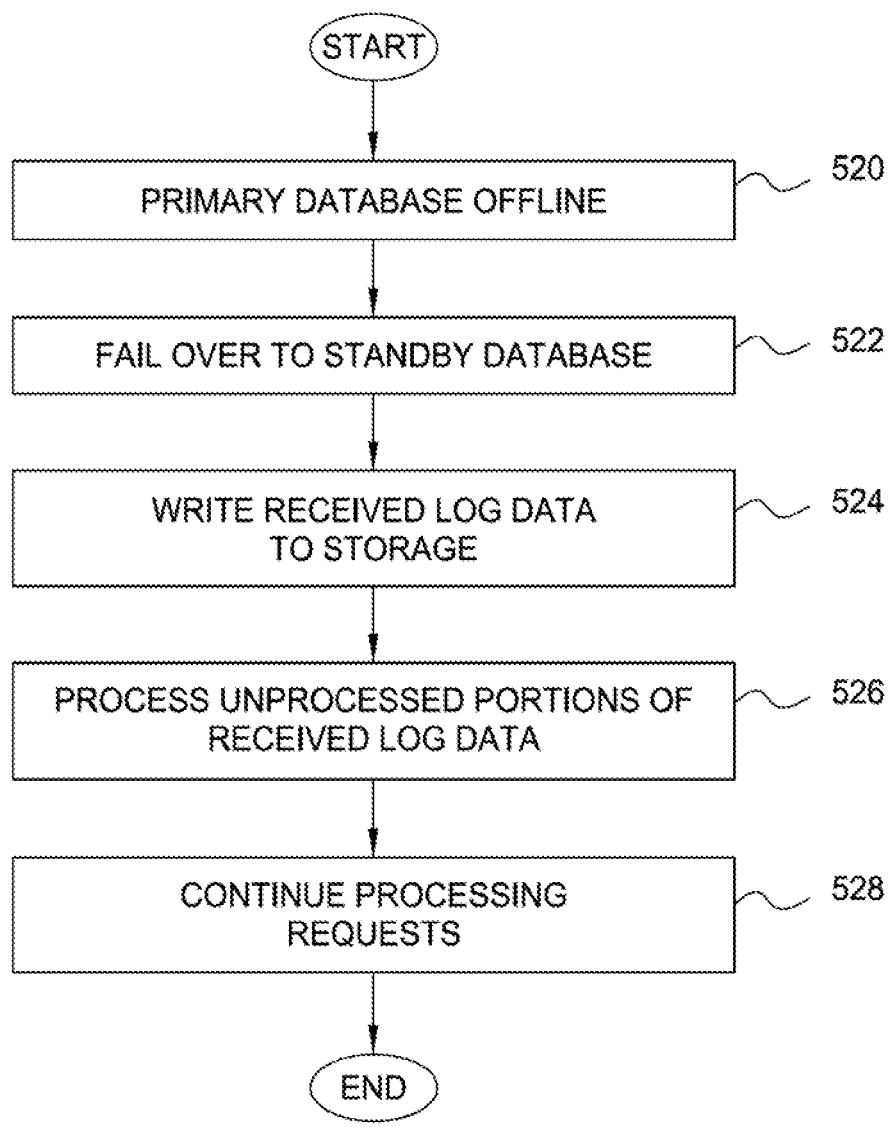
FIG. 5 is a flow diagram illustrating a method for failing over to a standby database management system, according to one embodiment of the present invention.

FIG. 5 is a flow diagram illustrating a method for failing over to a standby database management system, according to one embodiment of the present invention. As shown, the method 500 begins at step 520, where the primary DBMS goes offline. This may occur because of a variety of reasons including natural disaster or man-made disaster. Additionally, the primary DBMS 232 may be taken offline intentionally as part of a disaster recovery exercise. In any event, once the primary database is unavailable, the solution fails over to the standby database 284 and the standby DBMS 282 assumes the role previously held by the primary DBMS 232 (step 522). For instance, because the primary DBMS 232 in this example is responsible for data modification operations, if the primary DBMS 232 goes offline, the solution may fail over to the standby system 170, whereupon the standby DBMS 282 will then become responsible for data modification operations.

In one embodiment, upon interruption of the connection between the primary DBMS 232 and standby DBMS 282, (e.g., the primary DBMS 232 going offline), the standby DBMS 282 also removes any log data in the transaction log buffer 286 that occurred after the most recently received LWLP. In an embodiment configured to use synchronized log shipping, the standby DBMS 282 may also remove any stored transaction log data 267 that occurred after the most recently received LWLP. That is, because the primary DBMS 232 may not have stored such data, the data may be lost in the event of a failure of the primary DBMS 232. Accordingly, in order to ensure the data on the standby database 284 is synchronized with the primary database 234, the standby DBMS 282 removes any data occurring subsequent to the most recently received LWLP. Of course, if the primary DBMS 232 had already stored such data, the primary DBMS 232 may retransmit such data to the standby DBMS 282 when the primary DBMS 232 comes back online and resumes its role.

Once the solution fails over to the standby system 270, the standby DBMS 282 the standby DBMS 282 writes the received log data to storage 274 as, for example, transaction log data 276 (step 524). By storing the log data, the log data will be available for use in, for instance, database recovery operations (e.g., crash recovery or rollforward recovery operations). Once the data is written to storage, the standby DBMS 282 processes any unprocessed portions of the received transaction log data (step 526). That is, because the standby DBMS 282 is assuming the role of the primary DBMS 232, the standby DBMS 282 may first process any unprocessed portions of the received log data so that the standby database 284 is up-to-date. As discussed above, in one embodiment, the standby DBMS 282 removes any portions of the log buffer occurring subsequent to the most recently received LWLP. Accordingly, in such an embodiment, the standby DBMS 282 only processes the portions of the log buffer occurring prior to the LWLP. Once the received log data is processed, the standby DBMS 182 continues processing requests in the role of the primary DBMS (step 528), and the method 500 ends.

Figure 6:
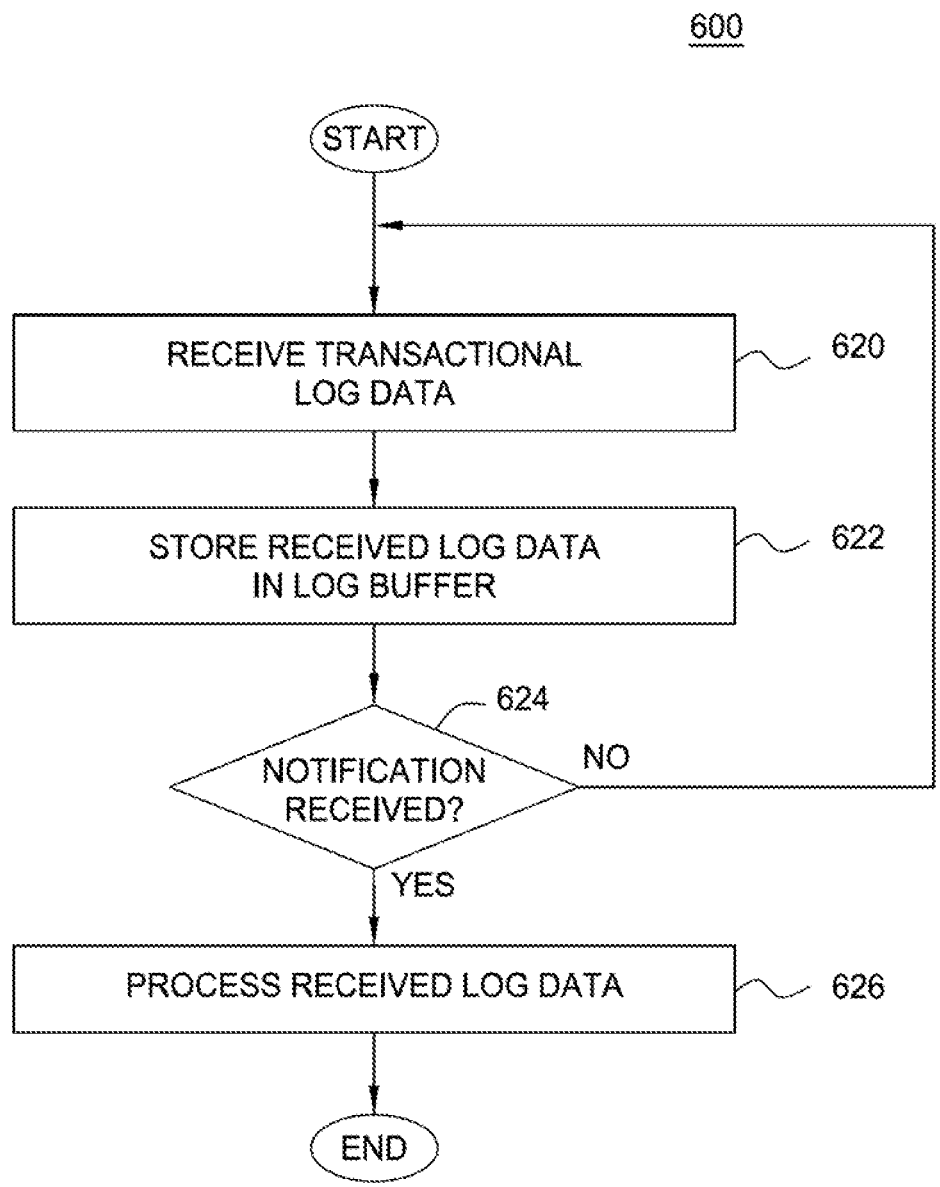
FIG. 6 is a flow diagram illustrating a method for log-shipping data replication, according to one embodiment of the present invention.

FIG. 6 is a flow diagram illustrating a method for log-shipping data replication, according to one embodiment of the present invention. As shown, the method 600 begins at step 620, where the standby system 170 receives transactional log data from the primary system 120. As discussed above, in an embodiment configured for use with two database systems, such communication may occur between the primary DBMS 232 and the standby DBMS 282. As a second example, in an embodiment configured for use with two file servers, such communication may occur between a primary file-sharing service and a standby file-sharing service. Upon receiving the transactional log data, the standby system 170 stores the received log data in a log buffer (step 622).

The standby system 170 then determines whether a notification has been received from the primary system 120, indicating that corresponding log data has been written to storage on the primary system 120 (step 624). In one embodiment, the notification may include a last-written log position (or "LWLP") identifying the last page written to storage by the primary DBMS 232. The standby DBMS 282 may then use the received LWLP to determine which received log pages have been successfully committed to storage 224 by the primary DBMS 232. That is, in an embodiment where the primary DBMS 232 processes the log buffer sequentially, the standby DBMS 282 may determine that the primary DBMS 232 has successfully stored pages of the log buffer that come before the LWLP, and has not yet stored the pages subsequent to the LWLP.

If no notification has been received, the method 600 returns to step 620, where the standby system 170 receives transactional log data from the primary system 120. On the other hand, if the notification is received indicating that corresponding log data has been written to storage on the primary system 120, the standby system 170 then process all the received log data in the data buffer (step 626). As discussed above, in one embodiment of the invention, the standby DBMS 282 processes only the received data in the log buffer that occurred prior to the LWLP. Once the data in the data buffer is processed, the method 600 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for data replication, comprising:
   responsive to a first request specifying a first amount of space, allocating a first buffer portion of a transaction log buffer to a first transaction at a primary system communicatively coupled to a standby system, wherein a size of the first buffer portion matches the first amount of space, wherein the transaction log buffer comprises a contiguous area of memory comprising a plurality of buffer portions, each allocated to a respective transaction, and wherein the first buffer portion is fully formed when filled with log data related to the first transaction and to be written to storage on the primary system;
   upon determining that the first buffer portion is fully formed, before the log data is written to the storage on the primary system, and before at least a second buffer portion of the transaction log buffer is fully formed, transmitting the log data in the first buffer portion to the standby system, from the primary system, without transmitting log data in the second buffer portion; and
   upon writing the log data to the storage on the primary system and after the log data in the first buffer portion is transmitted to the standby system, transmitting a notification to the standby system, from the primary system, wherein the standby system is configured to process the log data responsive to receiving the notification from the primary system.

2. The method of claim 1, further comprising:
   responsive to receiving the log data at the standby system, storing at least a portion of the received log data at the standby system.

3. The method of claim 2, further comprising:
   determining a connection between the primary system and the standby system has been interrupted; and
   upon reestablishing the connection, deleting a portion of the received log data at the standby system, wherein the deleted portion includes received log data not written to storage at the primary system.

4. The method of claim 1, further comprising:
   receiving a request for the standby system to change into a primary role; and
   responsive to receiving the request, processing an unprocessed portion of the log data at the standby system.

5. The method of claim 1, wherein the received notification includes a last-written log position of the primary system, and wherein the last-written log position indicates that the log data was written to storage on the primary system when the last-written log position is at or after a position of the log data.

6. The method of claim 5, wherein processing the log data at the standby system further comprises:
   identifying at least one portion of the log data having a position prior to the last-written log position of the received notification; and
   processing only the identified at least one portion of the log data at the standby system.

7. The method of claim 1, wherein the log data contains one or more database operations, and wherein processing the log data at the standby system further comprises:
   for each database operation of the one or more database operations, executing the database operation against an instance of a database on the standby system.

8. A system, comprising:
   a standby system; and
   a primary system communicatively coupled to the standby system, comprising:
      a computer processor; and
      a memory containing a program that, when executed on the computer processor, performs an operation for data replication, comprising:
         responsive to a first request specifying a first amount of space, allocating a first buffer portion of a transaction log buffer to a first transaction at the primary system, wherein a size of the first buffer portion matches the first amount of space, wherein the transaction log buffer comprises a contiguous area of memory comprising a plurality of buffer portions, each allocated to a respective transaction, and wherein the first buffer portion is fully formed when filled with log data related to the first transaction and to be written to storage on the primary system;
         upon determining that the first buffer portion is fully formed, before the log data is written to the storage on the primary system, and before at least a second buffer portion of the transaction log buffer is fully formed, transmitting the log data in the first buffer portion to the standby system, from the primary system, without transmitting log data in the second buffer portion; and upon writing the log data to the storage on the primary system and after the log data in the first buffer portion is transmitted to the standby system, transmitting a notification to the standby system, from the primary system, wherein the standby system is configured to process the log data responsive to receiving the notification from the primary system.

9. The system of claim 8, the operation further comprising:
responsive to receiving the log data, storing at least a portion of the received log data.

10. The system of claim 9, the operation further comprising:
determining a connection between the primary system and the standby system has been interrupted; and
upon reestablishing the connection, deleting a portion of the log data at the standby system, wherein the deleted portion includes received log data not written to storage at the primary system.

11. The system of claim 8, the operation further comprising:
receiving a request for the standby system to change into a primary role; and
responsive to receiving the request, processing an unprocessed portion of the log data.

12. The system of claim 8, wherein the received notification includes a last-written log position of the primary system, and wherein the last-written log position indicates that the log data was written to storage on the primary system when the last-written log position is at or after a position of the log data.

13. The system of claim 12, wherein processing the log data further comprises:
identifying at least one portion of the log data having a position prior to the last-written log position of the received notification; and
processing only the identified at least one portion of the log data.

14. The system of claim 8, wherein the log data contains one or more database operations, and wherein processing the log data at the standby system further comprises:
for each database operation of the one or more database operations, executing the database operation against an instance of a database on the standby system.

15. A non-transitory computer-readable storage medium containing computer program code that, when executed by operation of one or more computer processors, performs an operation for data replication, the operation comprising:
responsive to a first request specifying a first amount of space, allocating a first buffer portion of a transaction log buffer to a first transaction at a primary system communicatively coupled to a standby system, wherein a size of the first buffer portion matches the first amount of space, wherein the transaction log buffer comprises a contiguous area of memory comprising a plurality of buffer portions, each allocated to a respective transaction, and wherein the first buffer portion is fully formed when filled with log data related to the first transaction and to be written to storage on the primary system;
upon determining that the first buffer portion is fully formed, before the log data is written to the storage on the primary system, and before at least a second buffer portion of the transaction log buffer is fully formed, transmitting the log data in the first buffer portion to the standby system, from the primary system, without transmitting log data in the second buffer portion; and
upon writing the log data to the storage on the primary system and after the log data in the first buffer portion is transmitted to the standby system, transmitting a notification to the standby system, from the primary system, wherein the standby system is configured to process the received log data responsive to receiving the notification from the primary system.

16. The computer-readable storage medium of claim 15, the operation further comprising:
responsive to receiving the log data at the standby system, storing at least a portion of the received log data at the standby system.

17. The computer-readable storage medium of claim 16, the operation further comprising:
determining a connection between the primary system and the standby system has been interrupted; and
upon reestablishing the connection, deleting a portion of the received log data at the standby system, wherein the deleted portion includes received log data not written to storage at the primary system.

18. The computer-readable storage medium of claim 15, the operation further comprising:
receiving a request for the standby system to change into a primary role; and
responsive to receiving the request, processing an unprocessed portion of the log data at the standby system.

19. The computer-readable storage medium of claim 15, wherein the received notification includes a last-written log position of the primary system, and wherein the last-written log position indicates that the log data was written to storage on the primary system when the last-written log position is at or after a position of the log data.

20. The computer-readable storage medium of claim 19, wherein processing the log data at the standby system further comprises:
identifying at least one portion of the log data having a position prior to the last-written log position of the received notification; and
processing only the identified at least one portion of the log data at the standby system.

* * * * *